(12) United States Patent
Davis et al.

(10) Patent No.: US 6,298,407 B1
(45) Date of Patent: Oct. 2, 2001

(54) TRIGGER POINTS FOR PERFORMANCE OPTIMIZATION IN BUS-TO-BUS BRIDGES

(75) Inventors: Barry R. Davis, Portland, OR (US); Nick G. Eskandari, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/034,624

(22) Filed: Mar. 4, 1998

(51) Int. Cl.[7] .................................................. G06F 13/00
(52) U.S. Cl. .............................................. 710/129; 710/52
(58) Field of Search .................................... 710/129, 126, 710/128, 52, 55, 57; 709/250

(56) References Cited

U.S. PATENT DOCUMENTS

| | | | |
|---|---|---|---|
| 4,727,537 | * 2/1988 | Nichols | 370/85 |
| 5,101,477 | * 3/1992 | Casper et al. | |
| 5,687,316 | * 11/1997 | Graziano et al. | 709/250 |
| 5,732,094 | * 3/1998 | Petersen et al. | 371/51.1 |
| 5,828,865 | * 10/1998 | Bell | 395/500 |
| 5,848,249 | * 12/1998 | Garbus et al. | 710/128 |
| 5,941,964 | * 8/1999 | Young et al. | 710/100 |
| 6,072,781 | * 6/2000 | Feeney et al. | 370/282 |

* cited by examiner

Primary Examiner—Ario Etienne
(74) Attorney, Agent, or Firm—Blakely, Sokoloff, Taylor & Zafman LLP

(57) ABSTRACT

Method and apparatus for tuning the performance of bridge devices, including PCI-to-PCI bridges as well as PCI local bus bridges (or host bridges). The embodiments of the invention permit a multiple-bus computer system to be tuned in view of the application and the bridge queue sizes. Such applications include those concerned with raw bandwidth (such as disk storage), and those that are sensitive to latency (such as networking and videoconferencing). The embodiments of the invention feature a control register that specifies storage conditions to be met by the read and write queues of the bridge. The programmed storage conditions are trigger points which cause the bridge to transfer data into or remove data from the queues during read and write transactions in order to promote the performance (throughput or latency) desired from the bridge.

17 Claims, 5 Drawing Sheets

TRIGGER POINTS FOR PERFORMANCE OPTIMIZATION IN BUS-TO-BUS BRIDGES

BACKGROUND INFORMATION

This invention is related to communication between computer buses, and more particularly to bus-to-bus bridge devices.

The development of computer bus architectures over the last thirty years has been influential in transitioning computers from being a research tool into becoming a practical, multi-purpose machine. Busses may now be found both within an integrated circuit (IC) processing unit and connecting the processing units to other agents such as external memory and peripheral devices. The physical characteristics of a single bus, however, place a limit on the number of agents (including peripheral devices and processors) which may attach to it. Many modern applications of computer systems therefore rely on multiple-bus architectures having a number of physically separate buses to further expand their functionality.

Physically separate buses are often combined into a single logical bus using a bridge. A bridge may include hardware (digital hardwired circuitry), software (high or low level commands and instructions to be executed by one or more processors), and firmware (software typically stored in different types of read-only memory) or combinations thereof, that monitor and control data traffic between at least two physically separate buses. The bridge interfaces one bus protocol to another to facilitate communication between agents on the different buses.

The bridge that couples two buses is typically configured to be transparent, so that the physically separate buses may be treated by the agents and the system as one bus. To achieve such a result, an address space is shared by agents on both buses. Requests (a read or a write) bearing an address range within the shared address space are generated by an initiator agent on an initiating bus. The bridge recognizes the address range and can forward the request to a target agent on a target bus. The bridge may thus be said to automatically perform the request on the target bus on behalf of the initiator agent.

Different bus and bridge architectures abound in the current state of computer technology. An example of a modern, computer bus is the Peripheral Components Interconnect (PCI) bus. The PCI bus is an industry standard, high performance, low latency system bus, generally defined by the PCI Special Interest Group (SIG) in *PCI Local Bus Specification*, Revision 2.1, Oct. 21, 1994. The PCI bus will be used throughout this disclosure to illustrate some of the principles behind and operation of the various embodiments of the invention. However, those principles may also be applied to other multiple-bus architectures.

The PCI SIG also maintains a bridge architecture described in *PCI-to-PCI Bridge Architecture Specification*, Revision 1.0, Apr. 5, 1994. The PCI bridge is also often referred to in this disclosure to illustrate some of the principles behind and operation of the various embodiments of the invention. However, those principles may also be applied to other bridge designs.

Transactions Using the Bridge

Transactions are defined here as complete transfers of data between an initiator and a target, where the initiator and target are on different physical buses coupled by a bridge. When forwarding data from one bus to another, bridges typically implement a number of data queues to hide the delay associated with requesting and obtaining access to the target bus for obtaining or forwarding the data. Each transaction is typically assigned a logical queue which is released when the transaction is completed.

The queue will typically be part of a memory or buffer that implements a First-In-First-Out (FIFO) data structure. The FIFO is a data structure from which items are taken out in the same order they were put in. It is also known as a "shelf", from the analogy with pushing items onto one end of a shelf so that they fall off the other. Typically, the FIFO may be written to and read from simultaneously. A FIFO in a bridge is useful for buffering a stream of data between an initiator and a target which are not synchronized, i.e., not sending and receiving at exactly the same rate.

A transaction as defined herein involves a request from an initiator to read from or write to a given address range which is claimed by a target. If the request is accepted by the bridge, then the transaction begins and an appropriate access is started. An access typically includes an idle phase for setup, an address phase during which address information for the particular request is exchanged, and sometimes a data phase during which data is exchanged.

Alternatively, the request may be denied by the bridge. In that case, the bridge issues a termination known as a retry signal to the initiator. This may occur if the assigned bridge queue is full or has no data to transfer. Sometimes, the new request may be denied if there are no free queues available to be assigned, where all the queues are being used for other pending transactions. If the request is denied, the initiator may repeat the request to complete an ongoing transaction or attempt to start a new one.

Where the request is accepted and a first access is started, the access may be prematurely terminated by either the initiator, the target, or the bridge, for various reasons. If this happens, the request may be repeated or a subsequent request may be issued by the initiator to complete the transaction and transfer all of the requested data. Splitting the transaction so that the desired data is transferred in multiple accesses, however, introduces increased overhead in the form of additional accesses having additional idle and address phases. The increased overhead can reduce throughput, where throughput is the amount of data transferred across the bridge per unit time, averaged over a given period. In contrast, latency is defined as the time needed to provide the initiator or target with the first data block of a multiple-block transaction. These two performance criteria will be used throughout this disclosure to help illustrate some of the advantages of the different embodiments of the invention. It would be desirable to have a technique that permits either an increase in throughput or decrease in latency so that the bridge may be tuned to the particular application.

Write Transactions

The write transaction is typically performed as a posted write transaction in the PCI model. In such transactions, the initiator transfers data into a queue in the bridge after the bridge accepts the initiator's request. The bridge then requests control of the target bus and after receiving control forwards the data from the queue to the target. The transaction, however, is completed on the initiating bus before being completed on the target bus.

Write transactions include the typical memory write, and the memory write and invalidate (MWI). The two write transactions differ in that MWI must be for an integer number of cache memory lines, whereas the plain memory write can be used to write smaller amounts of data.

On average, the buses on either side of the bridge will be kept busy for a much longer time with MWI transactions than with plain memory writes. This may unnecessarily tie up the target bus that has agents which are not configured to respond to MWI requests. For example, the initiator may be a newer generation peripheral device that is plugged into an older multiple-bus computer system having older generation targets, where the initiator supports MWI but its target does not. To improve performance in such systems, the software in the initiator could be modified to not issue the MWI and instead use plain memory writes to perform transactions aimed at targets which don't support MWI. Such a change, however, will need to be implemented on each device and may present a cumbersome task for the system operator as many new devices are added over the lifetime of the system. Therefore, it would be desirable to have a technique for handling MWI requests in a multiple-bus computer system without having to modify the software in each new device that may be added to the system over its lifetime.

Read Transactions

In addition to write transactions, another area of performance optimization in bridges lies in read transactions. Read transactions across a bridge are more involved than write transactions in that a read transaction is typically performed as a delayed transaction rather than as a posted transaction. For example, in the PCI model, the PCI bridge in a delayed transaction latches the information required to complete the initial request, and the initiator is then signaled a retry. The bridge then performs the initial request over the target bus on behalf of the initiator. Any returning data or response from the target is stored in a bridge queue. The initiator must then repeat the original request to retrieve the data from the queue and complete the transaction.

With read transactions in a PCI system, the exact amount of data that the bridge reads over the target bus is not specified, but rather may depend on the particular PCI command type and whether the memory address space to be read from is prefetchable or not. While the initiator knows the exact amount of data it needs to read, it cannot specify this amount under the PCI model.

When the memory space is prefetchable, the bridge in response to a read request reads and stores data from the target up to a fixed and predetermined number of blocks, or until the assigned bridge queue is full. This speculative operation on behalf of the initiator is done in anticipation of any subsequent or repeated read requests from the initiator. Upon arrival of the repeated read request, the read data begins to flow to the initiator from the bridge queue, but can be stopped by the initiator at any time. Any data in the queue which the bridge had read from the target but which is not transferred to the initiator is then discarded.

A drawback of this read prefetching scheme is that it wastes valuable bus time keeping the target bus busy. During any access, the initiating and/or target buses may be occupied or busy while data is transferred into or out of the queue in the bridge. While occupied, a bus normally cannot be used by other agents. If some of the prefetched data in a read access is subsequently discarded, the target bus was kept busy without resulting in any data transfer through the bridge. Therefore, an optimization scheme is desirable to help reduce the time during which the target bus is unnecessarily kept busy in this way.

Another area of bridge performance optimization lies in controlling the rate of data transfer between the initiator and the target. In the PCI multiple-bus architectures, the initiator and target agents on either side of a bridge are allowed to "throttle" the rate of data flow between them. Throttling occurs when either agent requests and obtains wait states from the bridge while data for a transaction is being stored in the bridge. The wait states reduce the rate at which data is accepted into or removed from the bridge.

If, however, the data rates on either side of the bridge differ by too much in one direction for too long, then the bridge queue will become either full (blocking the initiator in a write transaction) or empty (not providing any data to the target), halting the simultaneous flow of data into and out of the bridge. Given the above observations, therefore, it would be desirable to have further techniques that allow the optimization of data flow through the bridge so as to improve throughput or latency (depending on the application of the bridge) and increase the likelihood of simultaneous flow.

SUMMARY

In one embodiment, the invention is directed at a bridge for coupling a first computer bus to a second computer bus. The bridge has first and second bus interfaces, a queue for temporarily storing data to be transferred from one bus interface to the other as part of a transaction, and a control register that represents one or more storage conditions to be met by the queue while performing the transaction.

DETAILED DESCRIPTION

The embodiments of the invention are described in greater detail below while referring to the figures. For purposes of explanation, specific embodiments are set forth below to provide a thorough understanding of the invention. However, as understood by one skilled in the art, from reading this disclosure, the invention may be practiced without such details. Furthermore, well-known elements, devices, process, steps, and the like, are not set forth in detail in order to avoid obscuring the invention.

Figure 1:
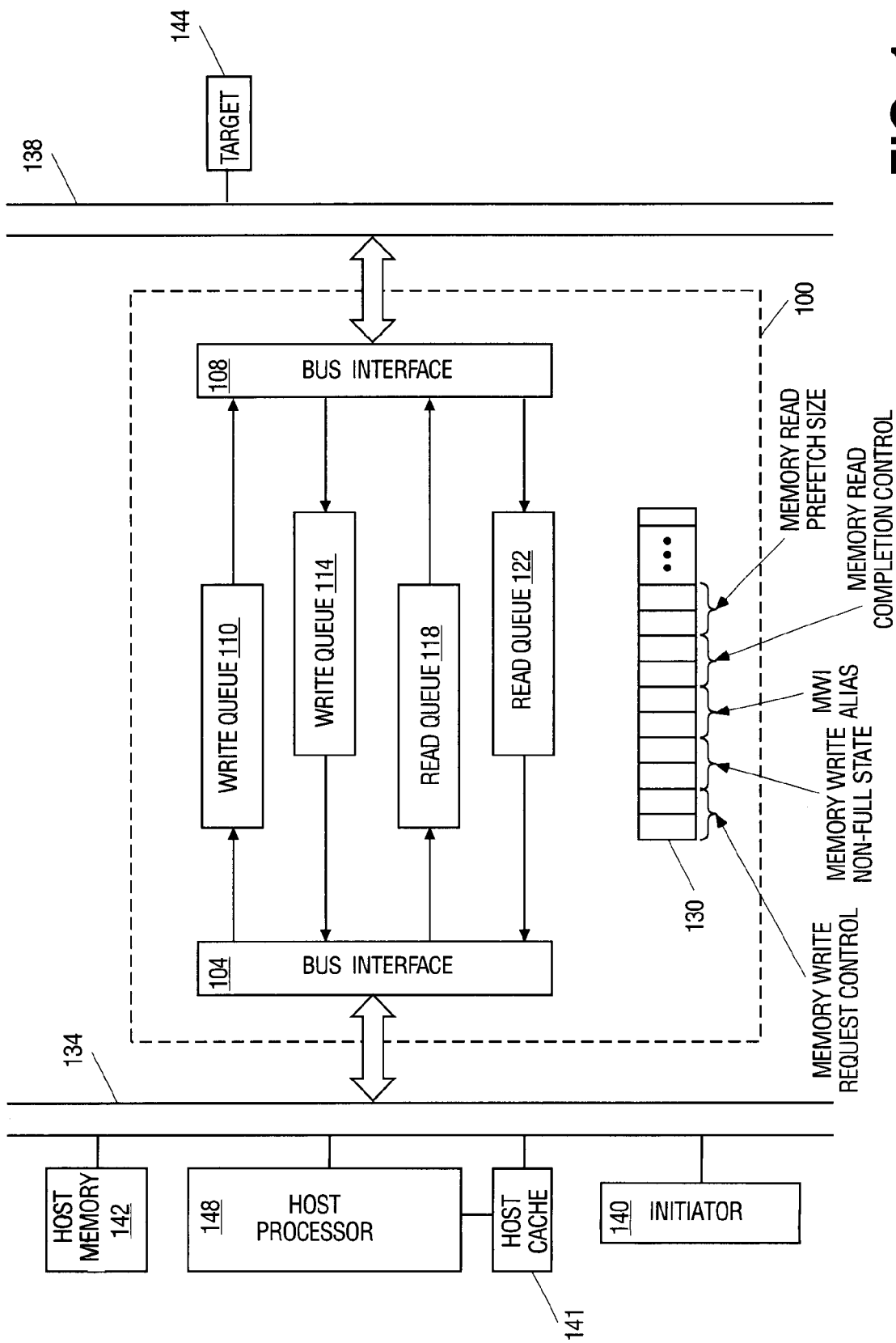
FIG. 1 illustrates part of a computer system having a bridge according to an embodiment of the invention.

FIG. 1 illustrates an embodiment of the invention as a computer system having first and second buses 134 and 138 coupled by a bridge or bridge device 100. The bridge 100 includes a number of logical queues 110, 114, 118, and 122 that are used to buffer data transfers between the two buses. Each queue is used on a per transaction basis in that each new transaction when initiated is assigned a separate queue. The bridge 100 also has a first bus interface 104 and second bus interface 108 which couple the queues to the respective buses. A control register 130 is provided which identifies trigger points according to the different embodiments of the invention which are more fully described below.

In the following discussion, the first bus 134 is taken to be the initiating bus where a transaction is initiated by the initiator 140, while the second bus 138 is the target bus coupled to the target 144. A host processor 148 coupled to the first bus 134 may also be used to execute a program which configures the control register 130 with the appropriate values.

Memory Write Non-Full State

This first embodiment of the invention is based on the idea that it is not desirable to completely fill a bridge queue during a write transaction if doing so prevents the bridge from accepting any data in subsequent write requests, or prevents accepting such data in a single access. If the bridge is forced to reject such data because its write queue for that particular transaction is full, then simultaneous flow into and out of the bridge is halted. This reduces throughput if, in addition, the bridge cannot move data already in the queue to the target, perhaps because the target bus or agent is busy. Throughput is also reduced due to the overhead of multiple accesses needed on the initiating bus if the data from a subsequent request cannot be accepted in a single access because the queue had become full.

In this first embodiment, the bridge 100 is configured with a "non-full" state of the write queue 110. The non-full state is a condition of the queue 110 between completely empty and completely full. The queue 110 must be in the non-full state, i.e. have a minimum amount of free space (one or more data blocks as specified in the control register) available before a write request may be accepted by the bridge. The state may be defined in the control register 130 in response to a user command or configuration program executed by the host processor 148 on either bus 134 or bus 138. For example, two bits may be used in the control register to encode up to four different non-full states, as shown in FIG. 1.

Figure 2:
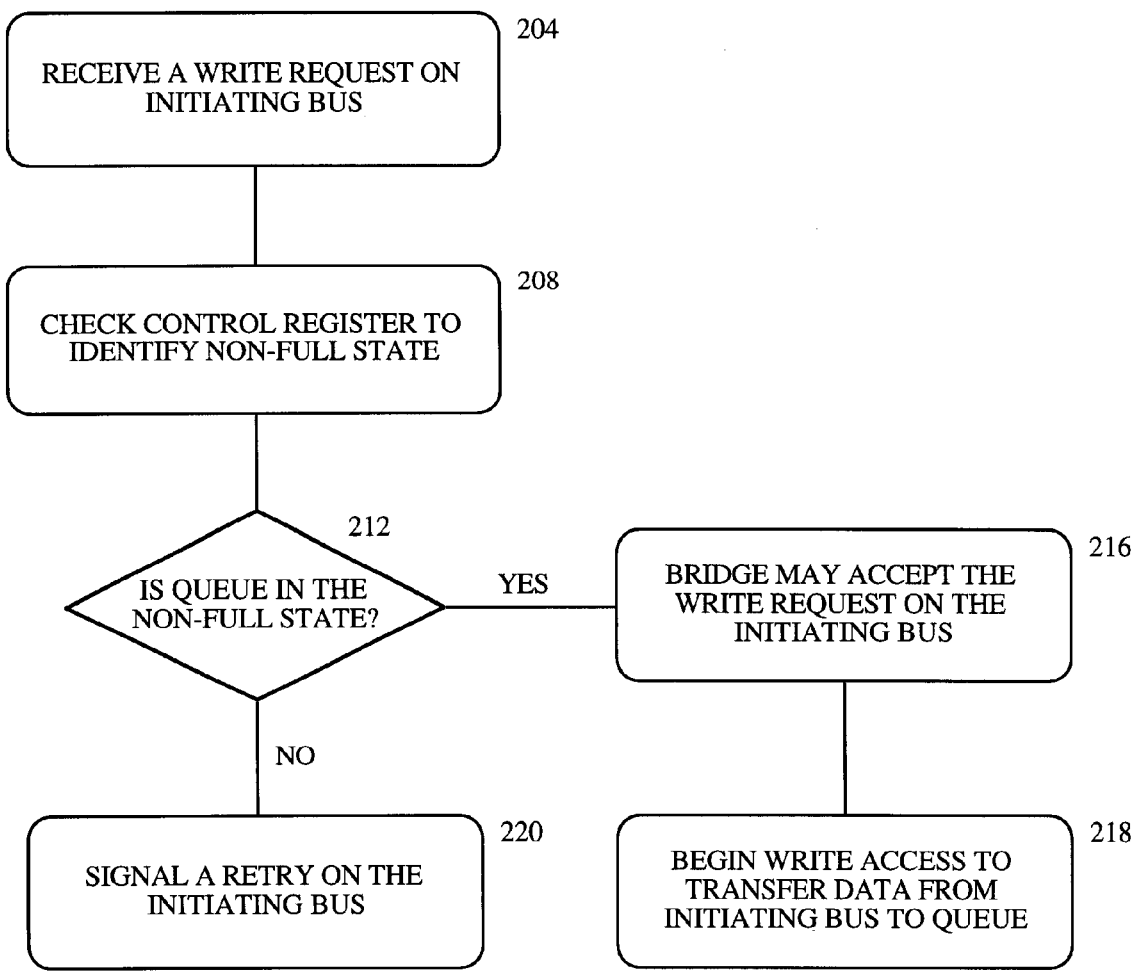
FIG. 2 is a flow diagram of the steps performed by a bridge in implementing a queue non-full state according to another embodiment of the invention.

Operation of the first embodiment of the invention may be illustrated as follows, according to the flow diagram in FIG. 2 and the system in FIG. 1. The bridge 100 is configured (in hardware and software, as described earlier) to perform the operations in FIG. 2. Beginning with block 204, a request for a write transaction from the initiator 140 is received over the initiating bus 134 and interface 104. The bridge then assigns a queue 110 to the transaction and begins an access to fill the queue with write data from the initiator. At any time thereafter, the initiator may terminate the access and resume the transaction at a later time by issuing a subsequent write request.

When a subsequent write request is received for the same transaction, operation continues with block 208 where the control register 130 is checked to identify the non-full state for the queue 110. Step 208 may be performed in response to detecting each write request, or may be performed any time earlier or after the transaction is started, depending on the particular implementation. In either case, operation continues with step 212.

In step 212, a comparison is made to determine if the queue 110 is in the non-full state. The non-full state is a storage condition of the queue, other than completely full or completely empty. If the write queue 110 has reached in the non-full state, the queue is deemed "full" and operation continues with step 220. There, the bridge signals a retry in response to the subsequent write request, and the request is not accepted. Meanwhile, the data in the queue may be transferred to the target 144 independent of requests by the initiator.

If, however, the write queue 110 is emptier than the non-full state by the time the subsequent request is received, the queue is "non-full", and operation continues instead of step 220 with step 216. There, the bridge is allowed to accept the write request. If accepted, then a write access over the initiating bus may begin in step 220 and more data for the transaction may be transferred to the queue 110. The above-described subsequent requests may be repeated several times during a transaction, depending on the total amount of data to be written, the size of the queue, and the ability to transfer the data from the queue to the target. A benefit of operating the bridge in this way may be illustrated by the following performance tuning example.

A computer such as a network server or a workstation may be designed with a bridge and the multiple-bus architecture of FIG. 1. If there is an acceptable likelihood that, given the expected traffic patterns across the bridge and the data processing capabilities of the different agents on the buses, the target bus 138 will stay relatively busy and/or relatively large burst transactions (having a relatively large amount of data) are requested on the initiating bus 134, then the non-full state of the queue is set closer to empty. This means that the queue 110 must be close to empty before the bridge accepts a write request. In this way, there will be a greater likelihood that the queue will have sufficient space to store all of the write request data in a single data phase, thereby reducing overhead associated with packetizing or splitting the transaction into multiple accesses on the initiating bus. In comparison, if the non-full state were set closer to full, then there will be greater likelihood that the queue will fill up prematurely (and thereby block or force the initiator to stop sending data) because of a busy target bus or a large amount of write data requested.

On the other hand, if it is expected that the target bus will remain relatively quiet and/or that mostly small amounts of write data are requested, then the non-full state is set closer to full. In this case, the likelihood of the queue becoming completely full (and therefore blocking the initiator) is less (even though the non-full state is set closer to full), because either the target bus is fast enough to remove data from queue and/or only small amounts of data are to be transferred in each access on the initiating bus. At the same time, the initiator is allowed to use almost the entire capacity of the queue, thereby further reducing the likelihood of blocking the initiator by reason of a full queue.

For each particular case, the predictions concerning the queue behavior may be determined based on bus traffic simulations or monitoring of actual traffic on the initiating and/or target buses, and the queue size. Indeed, simulation results have shown that varying the non-full state of the write queues in a bridge has a significant impact on throughput.

Memory Write Request Control

This second embodiment of the invention focuses in part on how quickly the bridge 100 requests control of the target bus 138 in order to remove and forward write data from the queue 110 to the target 144. This embodiment is based on the idea that it is not always desirable to allow the bridge to request control of the target bus as soon as the bus becomes available. As described below in connection with FIGS. 1 and 3, this embodiment of the invention may be useful for performance tuning of the latency of the bridge, in particular when the initiating and target buses have different bandwidth requirements, e.g., initiating bus is 64 bits wide while the target bus is only 32 bits wide.

The embodiment in FIG. 1 includes the bridge 100 having the queue 110 for temporarily storing data received from the initiator over the bus 134 and to be forwarded to the target over bus 138 as part of a write transaction. The control register 130 includes Memory Write Request Control bits which determine a trigger point when the target bus may be requested by the interface 108 for forwarding the data that was received from the initiating bus and had been stored in the queue 110. The bits may specify a non-zero amount of data (greater than one data block) that must be received and stored in the queue (as part of the write transaction) before the bridge 100 may request control of the target bus. For example, two bits may be used to encode at least three different quantities of QWORDs in the queue, where each QWORD is a block of data having a width of 64 bits. As with the first embodiment described above, the queue 110 may be the posted memory write queue in a PCI bridge.

If it is desired to decrease latency in a write transaction, then the write request control storage condition is set to a relatively small number of blocks of data. Data may begin to be transferred to the target from the queue as soon as the specified number of blocks have been received and stored.

Another situation in which setting a lower storage condition may be beneficial is when the target bus is expected to be relatively busy, such that the queue might become full and block the initiator before the target bus can be acquired. Under those conditions, a lower storage condition will give the bridge a head start in emptying the queue, and may provide enough time for the bridge to acquire the target and begin unloading write data from the queue before the queue has become full.

If it is desired to improve throughput rather than latency, and the bridge's surrounding environment is such that the target bus may be acquired relatively quickly, e.g., relatively quiet target bus, then the write request control storage condition may be set to indicate a larger amount of data, an amount less than the full capacity of the queue. This will help ensure that a large amount of data is available to be forwarded to the target in a single access when the target bus is acquired, thereby improving throughput.

Yet another situation in which it might be beneficial to set the write request trigger point to a larger amount is when the initiator 140 is likely to request delays during a transaction, for example in the form of wait states, from the bridge 100. This will help ensure that the queue 110 is less likely to become empty during the transaction and retains enough data to be forwarded over the target bus while the initiator delays the arrival of further data, in order to increase the likelihood of simultaneous data flow through the bridge, thus increasing or maintaining a desired throughput.

Figure 3:
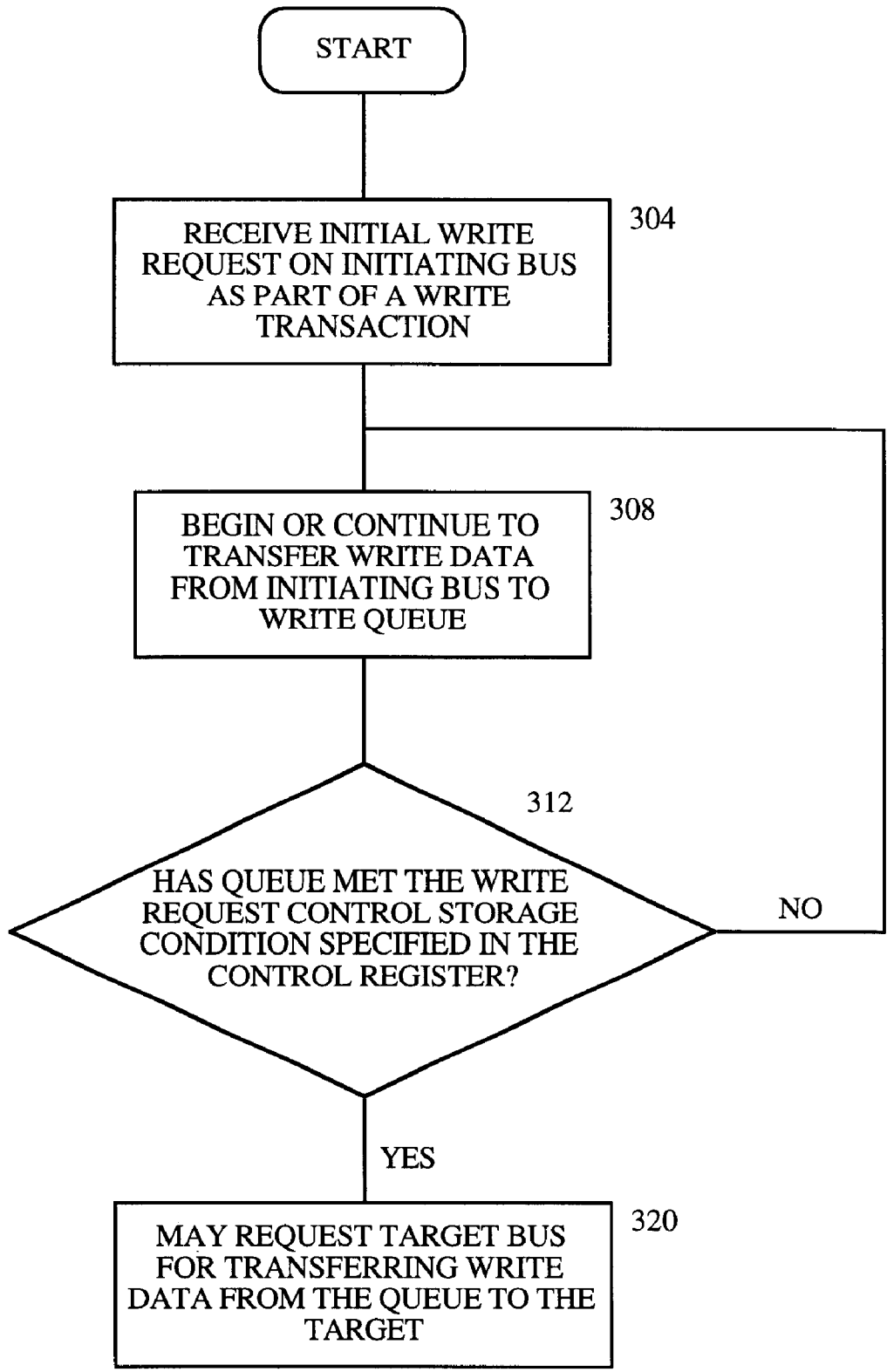
FIG. 3 is a flow diagram of the steps performed by a bridge in implementing write request control according to another embodiment of the invention.

FIG. 3 illustrates an exemplary method of performing a write transaction using the write request control mechanism in a bridge embodiment of the invention. In step 304, the bridge 100 receives an initial write request from the initiator to begin a write transaction. Operation continues with step 308 where data begins to transfer into the queue 110 over the initiating bus 134. In step 312, a determination is made as to whether the queue meets the write request control storage condition specified in the control register 130, i.e., sufficient data has been transferred to the queue. If yes, then in step 320, the target bus may be requested. When the target bus is subsequently acquired, the bridge begins to transfer the write data from the queue to the target. Meanwhile, fresh write data may continue to be received into the queue from the initiator.

Returning to step 312, if the storage condition has not been met, then the bridge is not permitted to request the target bus, but may continue to receive fresh write data into the queue. The transfers into and out of the queue may otherwise occur independently of one another.

MWI Alias

In a further embodiment of the invention which deals with the write request, the bridge 100 is configured to forward a MWI request on the initiating bus as a conventional memory write over the target bus if it is expected that the target bus couples agents, such as target 144 in FIG. 1, which are not equipped to process the MWI request. Such agents include, for example, older generation memory controllers and bridges. In this way, the software and hardware configuration of each new initiator 140 need not be altered. The computer system operation may be optimized for the plain memory write transaction by configuring the control register 130 to enable the MWI conversion feature. When enabled, logic circuitry in the bridge is directed to change the command portion of the MWI transaction into that of a plain memory write before performing the transaction on the target bus.

Memory Read Prefetch Size

The embodiments of the invention that work with read transactions are as follows. A first embodiment of the invention dealing with read transactions permits the maximum size of data prefetched from the target during a read transaction to be adjusted by bits in the control register 130. This improvement may be particularly effective in improving bridge performance when the bridge is configured to discard an unrequested portion of the prefetched data that resides in a bridge read queue.

After receiving an initial read request and signaling a retry on the initiating bus, the bridge determines the maximum data size to be prefetched by checking the appropriate bits in the control register 130. Only after the bridge obtains as much data as possible (up to the maximum amount stated in the control register 130) from the target and stores the data in the read queue 122 may the bridge accept a repeated read request on the initiating bus, and cause the transfer of the read data from the queue 122 to the initiator 140.

The system operator or designer reduces the amount of unrequested data that may be subsequently discarded by adjusting the prefetch size in control register 130 to any number of data blocks. The bridge may thus be tuned to the particular application. For example, if the application is mass storage and the initiator is likely to request large burst read transactions from the target 144 being a magnetic disk storage controller, then the prefetch size may be set to a larger amount with some confidence that a relatively large amount of data will be subsequently requested by the initiator. The prefetch size should be adjusted to reduce the amount of unrequested data that will be discarded, thereby making more efficient use of the target bus, in view of the particular bridge application.

Memory Read Completion Control

Figure 4:
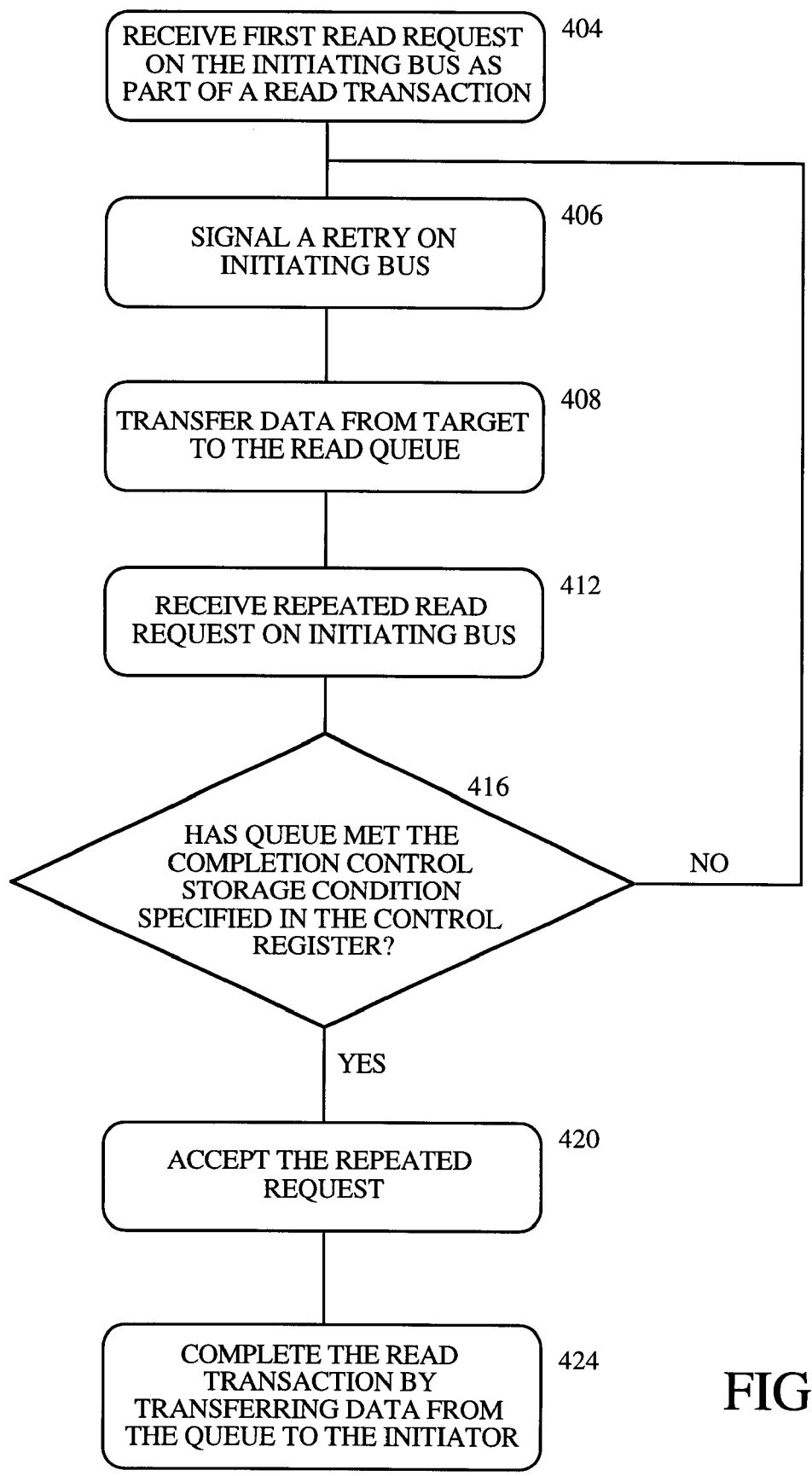
FIG. 4 shows the steps performed by a bridge in implementing read completion control according to another embodiment of the invention.

This second embodiment of the invention concerning read transactions is described using FIGS. 1 and 4. The embodiment provides bits in the control register 130 that control the behavior of the initiating bus interface 104 for a delayed memory read transaction. The bits identify a read completion control storage condition for the queue 122 that determines when to allow the initiator 140 access to the read data stored in the queue 122. The control register 130 may be programmed to change the minimum number of data blocks that must be received from the target and stored in the queue 122 before the bridge may accept a repeated read request on the initiating bus 134 and return data from the queue 122. For example, two bits may be used to encode four different quantities of QWORDS (blocks of data 64 bits wide) that must be received and stored in the queue before a repeat request may be accepted.

In a slightly different embodiment, if all of the requested read data has been received and stored in the queue 122, i.e., the transaction is completed on the target bus, then the stored data may be delivered to the initiator regardless of whether or not the completion control storage condition specified in the control register 130 has been met by the queue.

FIG. 4 illustrates a series of steps to be performed by the bridge in implementing this embodiment of the invention. Beginning with block 404, a first read request is received from the initiating bus 134 to begin a read transaction. In a PCI embodiment, the read transaction could be any one of memory read, memory read line (MRL) and memory read multiple (MRM).

After assigning a read queue 122 to the transaction (provided, of course, that a free read queue is available) and obtaining the read address information, the bridge then signals a retry on the initiating bus 134 in step 406. The bridge then attempts to acquire the target bus 138. If successful, transfer of read data from the target 144 will start in step 408. The bridge may otherwise continue to attempt to acquire the target bus in order to begin the transaction on the target bus.

When a repeated request is received on the initiating bus prior to completion of the read on the target bus, as in step 412, then a decision is made in block 416 as to whether enough read data has been received in the queue to meet the completion control storage condition specified in the control register 130. If not, then the initiator is signaled a retry in block 406. Meanwhile, data may continue to be transferred to the queue 122 from the target in block 408.

If, however, in decision block 416, the queue has received a sufficient amount of read data from the target to satisfy the storage condition, then the repeated request may be accepted and the read transaction may be completed on the initiating bus by attempting to transfer read data for the transaction from the queue to the initiator, preferably in a single read access.

By varying the completion control storage condition as a function of the depth of the read queue and bridge traffic conditions, a user can tune bridge performance to better match the bridge to its surrounding environment. For example, consider a mass storage application such as data backup where the initiator is a disk controller seeking to read data from the target 144 which is a memory controller. The initiator in this case might not be concerned with latency, but rather would desire high throughput. Therefore, the user would configure the Memory Read Completion Control portion of the control register 130 to indicate a relatively large amount of data. In this way, more data may be transferred to the initiator in a single access to complete the transaction, at the expense of increasing latency.

Figure 5:
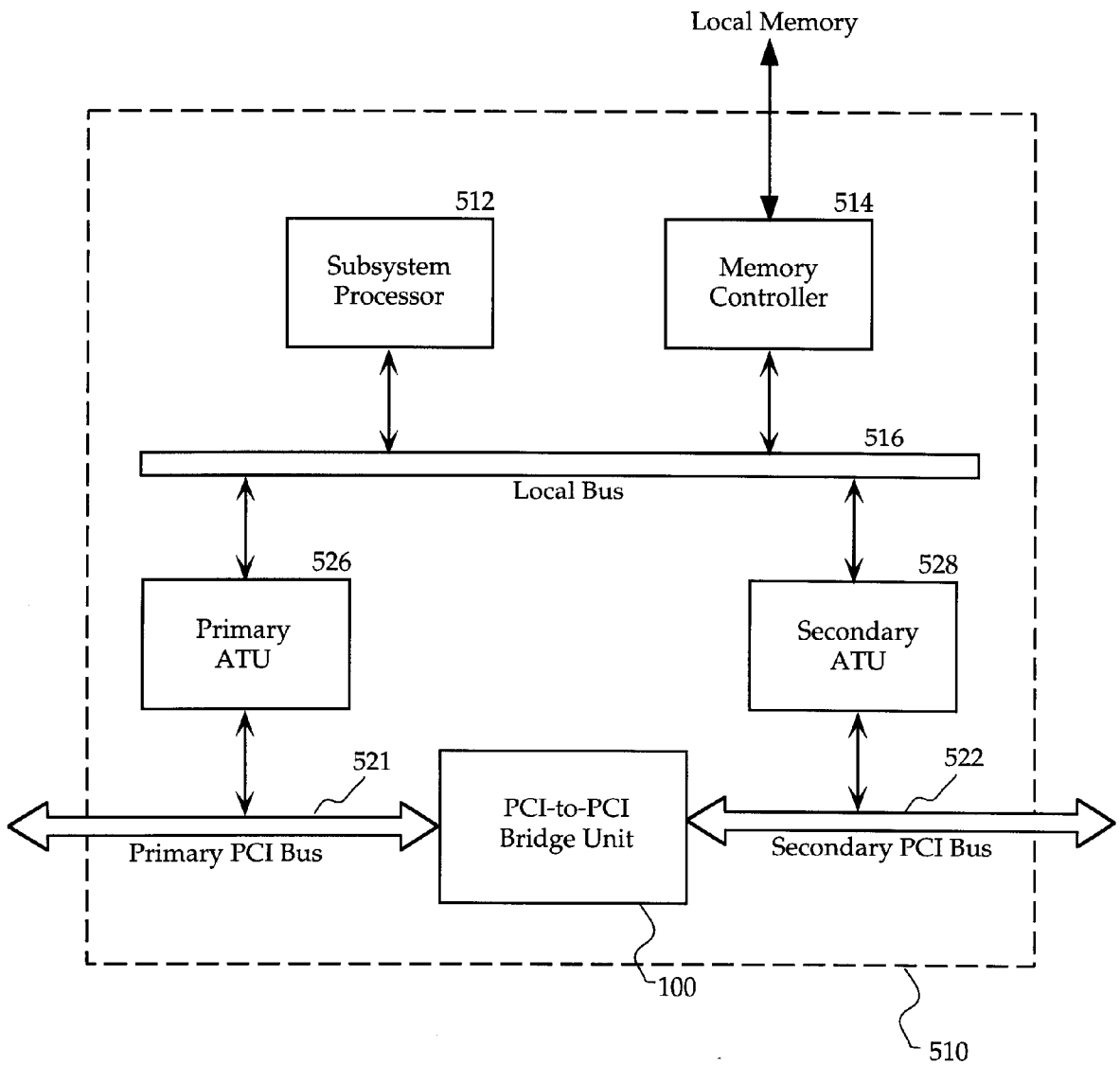
FIG. 5 is a block diagram of an intelligent I/O subsystem featuring a performance-tunable bridge, according to another embodiment of the invention.

A performance-tunable bridge 100 featuring the control register 130 may be used as a component of an intelligent I/O subsystem 510 in FIG. 5. The I/O subsystem 510 features a subsystem processor 512 and memory controller 514 on a third bus (local bus 516). The local bus is coupled to the primary 521 and secondary 522 PCI buses through respective address translation units (ATUs) 526 and 528. The I/O subsystem 510 may be implemented as a single IC and used as part of a system application such as a network server motherboard. The motherboard would include, in addition to the I/O subsystem 510 and the PCI buses 521 and 522, a host processor and memory coupled to the primary bus 521, and one or more network interface controllers coupled to the secondary bus 522. The network controllers may be depicted by several instances of the target 144 in FIG. 1. The bridge 100 in the I/O subsystem 510 may be tuned as described above to optimize its latency in order to improve the performance of the network server motherboard.

To summarize, the embodiments of the invention described above are directed at a bridge and computer system, in which the performance of the bridge may be tuned in view of the depth of the data queues and the particular system application. The embodiments of the invention are, of course, subject to other variations in structure and implementation. For example, the bits in the control register 130 may be programmable (read and write) or alternatively, one-time programmable (programmable read-only-memory), in-circuit programmable (such as in a flash memory), or even test bits (programmable during a test batch of the IC, but then fixed as read-only production). The control register 130 may be accessed by either the host processor 148 (see FIG. 1) or by the subsystem processor 510 of the I/O subsystem 510 embodiment in FIG. 5.

Also, although the embodiments of the control register 130 described above have two bits representing up to four different trigger point/storage conditions of the different data queues, a greater number of bits may alternatively be used, thus allowing finer granularity in the performance tuning of the bridge and the surrounding computer system.

Therefore, the scope of the invention should be determined not by the embodiments illustrated but by the appended claims and their legal equivalents.

What is claimed is:

1. An apparatus comprising:

first and second bus interfaces;

a buffer to store data as a plurality of blocks to be transferred between the first and second bus interfaces as part of a transaction initiated over the first bus interface; and a control register that has a plurality of bits that specify an adjustable amount of space equal to one or more data blocks to be available in the buffer before a write request may be accepted to transfer said data from the first bus interface into the buffer.

2. An apparatus as in claim 1 wherein the control register may be accessed by a processor external to the apparatus to allow an adjustment in the amount of space to be available in the buffer before a write request may be accepted.

3. An apparatus as in claim 1 wherein the buffer is a Peripheral Component Interconnect (PCI) posted memory write queue.

4. An apparatus as in claim 1 wherein the control register is in part both readable and writable.

5. A bridge comprising:

a buffer to store a plurality of data blocks, said data blocks having been read by the bridge from a target in response to a first read request from an initiator, the bridge further configured to discard a portion of said data blocks from the buffer in response to the initiator accepting less than all of said data blocks in the buffer after having made a subsequent read request; and a control register to indicate an adjustable maximum number of data blocks that can be read by the bridge from the target in response to said first read request.

6. In a bridge coupling an initiating bus to a target bus through a data buffer, a method comprising:

receiving a write request on the initiating bus;

checking the content of a control register to determine a non-full state of the buffer, being an adjustable minimum amount of space equal to one or more data blocks, that must be available in the buffer before the write request may be accepted; and signaling a retry on the initiating bus if the buffer does not have the minimum amount of space, and beginning a write access to transfer data from the initiating bus to the buffer if the buffer has the minimum amount of space.

7. A method as in claim 6 wherein checking the content of a control register is performed in response to receiving the write request.

8. The method of claim 6 further comprising programming the non-full state in the control register.

9. In a bridge coupling an initiating bus to a target bus through a data buffer, a method comprising:
- programming a write request control condition into a control register to specify an adjustable minimum number of data blocks to be stored in the buffer before any of the blocks can be transferred from the buffer to the target bus;
- receiving a write request on the initiating bus;
- determining the write request control condition of the buffer by checking the control register;
- transferring data blocks from the initiating bus to the buffer until the queue has met the write request control condition; and then
- requesting the target bus to transfer said data blocks from the buffer to the target bus.

10. A method as in claim 9 wherein determining a write request control condition is performed in response to receiving the write request.

11. In a bridge coupling an initiator on an initiating bus to a target on a target bus through a data buffer, a method comprising:
- receiving a request for a read transaction on the initiating bus for a plurality of data blocks;
- receiving a subsequent read request for the plurality of data blocks on the initiating bus, prior to completing the read transaction on the target bus;
- determining the minimum number of data blocks that must be received in the buffer by checking a control register which allows the minimum number of data blocks to be adjusted; and
- servicing the subsequent read request by transferring the read data from the buffer to the initiator only if the buffer contains the minimum number of data blocks indicated by the control register.

12. A method as in claim 11 wherein determining the minimum number of blocks is performed in response to receiving the read request.

13. An apparatus comprising:
- a first bus and a second bus; and
- a bridge coupled between the first and second buses, the bridge having a buffer to store data to be transferred from the first bus to the second bus as part of a write transaction initiated on the first bus, the bridge being unable to move said data from the buffer to the second bus if the second bus is busy, and a control register to indicate an adjustable minimum number of data blocks to be stored in the buffer before the bridge may request control of the second bus to move said data from the buffer.

14. An apparatus as in claim 13 further comprising:
- a processor coupled to the first bus; and
- a network interface controller (NIC) coupled to the second bus, wherein the write transaction is between the processor and the NIC.

15. An apparatus comprising:
- first and second bus interfaces;
- a buffer to store a plurality of blocks of data to be transferred from the second bus interface to the first bus interface as part of a read transaction initiated over the first bus interface; and
- a control register to indicate the minimum number of blocks that must be received in the buffer from the second bus interface before any of said data blocks may be moved from the buffer to the first bus interface in response to a subsequent read request that followed an initial read request initiated over the first bus interface.

16. An apparatus as in claim 15 further comprising:
- a first bus coupled to the first bus interface;
- a second bus coupled to the second bus interface;
- a processor coupled to the first bus; and
- a network interface controller (NIC) coupled to the second bus, wherein the transaction is between the processor and the NIC.

17. An apparatus as in claim 15 wherein the subsequent read request is part of a Peripheral Component Interconnect (PCI) delayed read transaction.

* * * * *